(12) United States Patent
Kumar et al.

(10) Patent No.: US 12,526,268 B2
(45) Date of Patent: Jan. 13, 2026

(54) SINGLE SIGN-ON (SSO) AUTHENTICATION SYSTEM FOR ENABLING DIGITAL COMMUNICATION BETWEEN MULTIPLE ENTITIES

(71) Applicant: Lumenore Inc., Madison Heights, MI (US)

(72) Inventors: Abhishek Kumar, Raisen (IN); Saurabh Mishra, Raisen (IN); Rahul Soni, Raisen (IN); Anurag Shrivastava, Raisen (IN)

(73) Assignee: Lumenore Inc.

( * ) Notice: Subject to any disclaimer, the term of this patent is extended or adjusted under 35 U.S.C. 154(b) by 230 days.

(21) Appl. No.: 18/454,801

(22) Filed: Aug. 24, 2023

(65) Prior Publication Data

US 2025/0071104 A1   Feb. 27, 2025

(51) Int. Cl.
*H04L 9/40* (2022.01)
*H04L 9/14* (2006.01)
*H04L 9/32* (2006.01)

(52) U.S. Cl.
CPC ............ *H04L 63/0815* (2013.01); *H04L 9/14* (2013.01); *H04L 9/3213* (2013.01)

(58) Field of Classification Search
CPC ...... H04L 63/0815; H04L 9/14; H04L 9/3213
See application file for complete search history.

(56) References Cited

U.S. PATENT DOCUMENTS

| | | | |
|---|---|---|---|
| 6,609,198 B1 * | 8/2003 | Wood | G06F 21/6209 726/8 |
| 11,012,444 B2 | 5/2021 | Bansal et al. | |
| 11,190,502 B2 * | 11/2021 | Desarda | H04L 63/20 |
| 11,522,701 B2 * | 12/2022 | Rowe | H04L 63/0884 |
| 11,736,469 B2 * | 8/2023 | Maria | G06F 21/41 |
| 2014/0331060 A1 * | 11/2014 | Hayton | G06F 21/32 713/185 |
| 2015/0089623 A1 * | 3/2015 | Sondhi | H04L 63/205 726/9 |
| 2016/0127352 A1 * | 5/2016 | Xu | H04L 63/0815 726/8 |
| 2018/0069702 A1 * | 3/2018 | Ayyadevara | H04L 9/14 |
| 2019/0058706 A1 * | 2/2019 | Feijoo | G06F 21/335 |
| 2022/0239640 A1 * | 7/2022 | Wang | H04L 63/0892 |
| 2023/0403152 A1 * | 12/2023 | Feijoo | H04L 9/0894 |
| 2025/0039164 A1 * | 1/2025 | Li | H04L 63/0815 |

FOREIGN PATENT DOCUMENTS

WO   WO/2001/072009 A2   9/2001

* cited by examiner

*Primary Examiner* — Shanto Abedin

(57) ABSTRACT

A system and a method for a single sign-on (SSO) authentication process that enables digital communication between multiple entities. The system includes a server with one or more processors. These processors receive a first authentication request from a first entity to access a second entity, which employs a first authentication process. Based on the request, the processors generate a second authentication request corresponding to the second authentication process used by the second entity. The second authentication request is then communicated to the second entity. After receiving a first response from the second entity, the processors generate a second response corresponding to that first response. This second response is communicated back to the first entity. Upon validating the second response, the processors allow communication between the first and second entities.

15 Claims, 6 Drawing Sheets

SINGLE SIGN-ON (SSO) AUTHENTICATION SYSTEM FOR ENABLING DIGITAL COMMUNICATION BETWEEN MULTIPLE ENTITIES

FIELD OF THE INVENTION

The present invention, in general, relates to an authentication process. More specifically, the present invention relates to a system and method for authenticating a user using a custom identity provider.

BRIEF STATEMENT OF THE PRIOR ART

It is common for any organizations to implement different methods of the authentication processes to cater to varying security levels required for their applications and data, wherein the authentication processes are convenient and flexible, offering a wide range of authentication options, enabling individuals to choose the most suitable method.

However, the potential disadvantages of the authentication processes employed by the prior art systems are the increasing complexity, and their networking may lead to higher costs and compatibility issues. Such multiple authentication processes might be confusing and discouraging for any user while navigating through said processes. Furthermore, implementation of such authentication processes requires additional training and support to avoid compromising security. Integrating multiple authentication systems can be challenging, making their maintenance and updates more difficult. Additionally, compliance efforts may also become complicated. Furthermore, user resistance could also hinder the adoption rates, potentially undermining the intended security improvements.

In view of the shortcoming discussed above, there is a need for a system that effectively bridges a gap between multiple entities, wherein each entity employs multiple authentication process, and further enable digital communication between multiple entities by implementing a digital Single Sign-On authentication between the multiple entities, wherein each entity employs a different authentication and authorization process.

SUMMARY OF THE INVENTION

In an embodiment, a system and method for a single sign-on (SSO) authentication process for enabling digital communication between multiple entities is provided. The system comprises a server, wherein the server comprises one or more processors. The one or more processors are configured to receive a first authentication request from a first entity for accessing a second entity, wherein the first entity employs a first authentication process, and the first authentication request corresponds to the first authentication process. The one or more processors are configured to generate a second authentication request based on the first authentication request received from the first entity, wherein the second authentication request corresponds to the second authentication process. The one or more processors are configured to communicate the second authentication request to the second entity, wherein the second entity employs a second authentication process. The one or more processors are configured to receive a first response from the second entity, wherein the first response corresponds to the second authentication process. The one or more processors are configured to generate a second response corresponding to the first response received from the second entity. The one or more processors are configured to communicate the second response to the first entity, and upon validation of the second response by the first entity the one or more processors enable communication between the first entity and the second entity.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
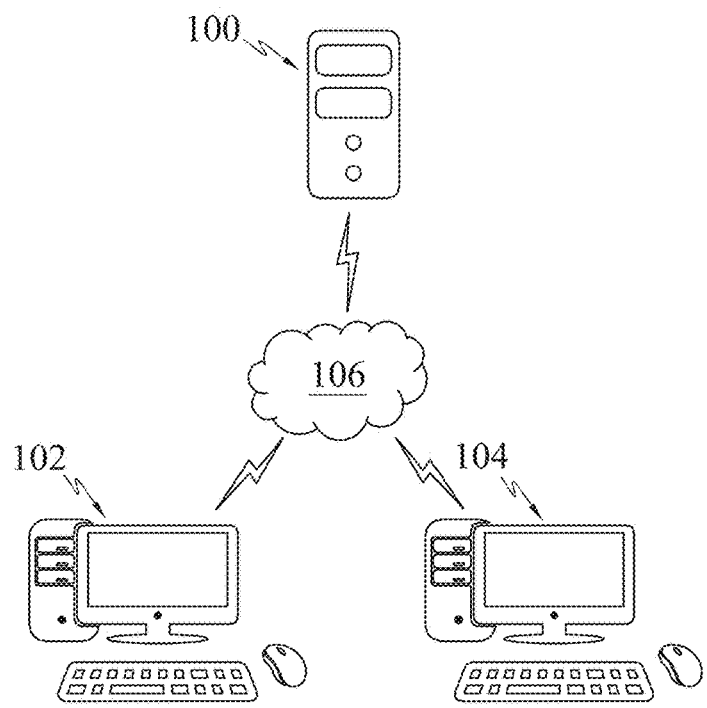
FIG. 1 illustrates a system 100 on a network 106 with a first entity 102 and a second entity 104.

FIG. 1 illustrates a system 100 on a network 106 with a first entity 102 and a second entity 104, wherein the system 100 may enable digital communication between the first entity 102 and the second entity 104 wherein each entity may employ a different authentication process. Further, each of the entities 102, 104 may comprise of a metadata, comprising at least a user's email address, wherein the metadata may be stored in a memory module 202.

In one embodiment, the system 100 may be configured to provide a single sign-on implementation between one or more entities. The system 100 may be referred to, but not limited to, as an identity provider (IDP), an authentication service provider, an identity management system, a single sign-on (SSO) provider, an identity authentication provider, a federated identity service, a user identity service, an identity verification service, an access management provider, a user authentication system and/or an identity federation service, among others.

Figure 2:
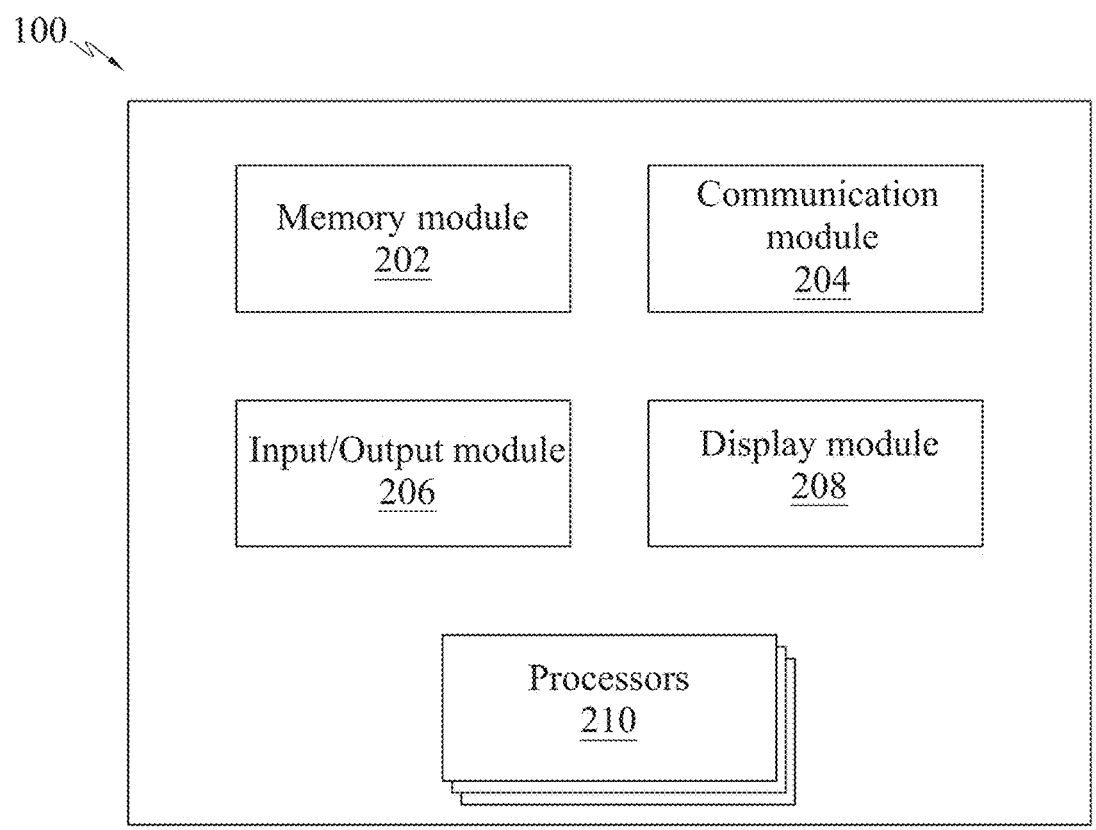
FIG. 2 illustrates a block diagram of the system 100 for a single sign-on (SSO) authentication process for enabling digital communication.

FIG. 2 illustrates a block diagram of the system 100. The system 100 comprises of a memory module 202, a communication module 204, an input/output module 206, a display module 208, and one or more processors 210.

In an embodiment, the memory module 202 may include a permanent memory, such as a hard disk drive, which may be configured to store data and executable program instructions implemented by one or more processors 210. The memory module 202 can be implemented as both primary and secondary memory. It can store additional data and program instructions that are loadable and executable on the one or more processors 210, as well as data generated during the execution of these programs. Further, the memory module 202 can either be a volatile memory, such as random-access memory and/or a disk drive, or a non-volatile memory. The memory module 202 may also comprise removable memory, such as a Compact Flash card, Memory Stick, Smart Media, Multimedia Card, Secure Digital memory, or any other memory storage that currently exists or may exist in the future. Furthermore, the memory module 202 contains a database configured to store information related to multiple entities and a plurality of users. These users may be registered with at least one entity among the multiple entities. Furthermore, the memory module 202 may store the metadata, which includes, but is not limited to, the user's email ID, authentication protocol, user's details, entities details, token details, etc.

In one embodiment, the communication module 204 may be provided as part of the system 100, facilitating metadata exchange and communication between various entities. The communication module 204 may comprise hardware and/or software components, enabling reliable and efficient transmission of information across the system 100. The communication module 204 may utilize various communication protocols, such as but not limited to wired (e.g., Ethernet) or wireless (e.g., Wi-Fi, Bluetooth) technologies, to establish connections with external devices or networks. The communication module 204 may also incorporate encryption and security measures to ensure the confidentiality and integrity of data during transmission. The communication module 204 may be configured to facilitate the communication flow necessary for an authentication, an authorization, and token(s) exchange, ensuring seamless interactions and secure data transfer between the system 100 and one or more entities in the authentication process.

The input/output modules 206 may be provided as an interface for input devices such as keypad, touch screen, mouse, and stylus among other input devices, and output devices such as speakers, printer, and additional displays among other. The input/output modules 206 may be used to exchange data between the multiple entities and the system 100 using the communication module 204 over a communication network 106.

The display module 208 may be configured to display content. The display module 208 may also be used to receive an input from a user. The display module 208 may be of any display type known in the art, for example, Liquid Crystal Displays (LCD), Light Emitting Diode Displays (LED), Cathode Ray Tube Displays (CRT), Orthogonal Liquid Crystal Displays (OLCD) or any other type of display currently existing or which may exist in the future. The display module 208 may be used to display the metadata/information/data exchanged between the system 100 and the first entity 102 and the second entity 104.

In an embodiment, the one or more processors 210 may be implemented as appropriate in hardware, and/or computer-executable instructions, and/or firmware, and/or combinations thereof. The Computer executable instruction and/or firmware implementations of the one or more processors 210 may include computer-executable and/or machine-executable instructions written in any suitable programming language to perform the various functions. The one or more processors 210 may be configured to enable authentication and authorization processes for a user. The one or more processors 210 may be configured to interpret and generate authentication token(s) compatible with various authentication and authorization protocols. The one or more processors 210 may act as an intermediary, translating user credentials and information into formats that can be understood and processed by different authentication services.

In an embodiment, the system 100 may be configured to provide a single sign-on (SSO) implementation between one or more entities, wherein the one or more entities, may also be referred as, an application, and/or client, and/or tenant, and/or an operating system, and/or a service provider (SP) etc.

In an embodiment, the one or more entities may include, but not limited to, PCs (personal computers), and/or Workstations, and/or laptops, and/or desktops, and/or computing devices etc.

In an embodiment, the system 100 may be configured to provide digital communication between multiple entities employing different authentication and authorization processes, wherein the authentication process may be, but not limited to, JWT (JSON Web Token(s)), and/or SAML (Security Assertion Markup Language), and/or OAuth (Open Authorization), and/or OpenID Connect, LDAP (Lightweight Directory Access Protocol), and/or Active Directory (AD), and/or Firebase Authentication, and/or Auth0 etc.

Figure 3:
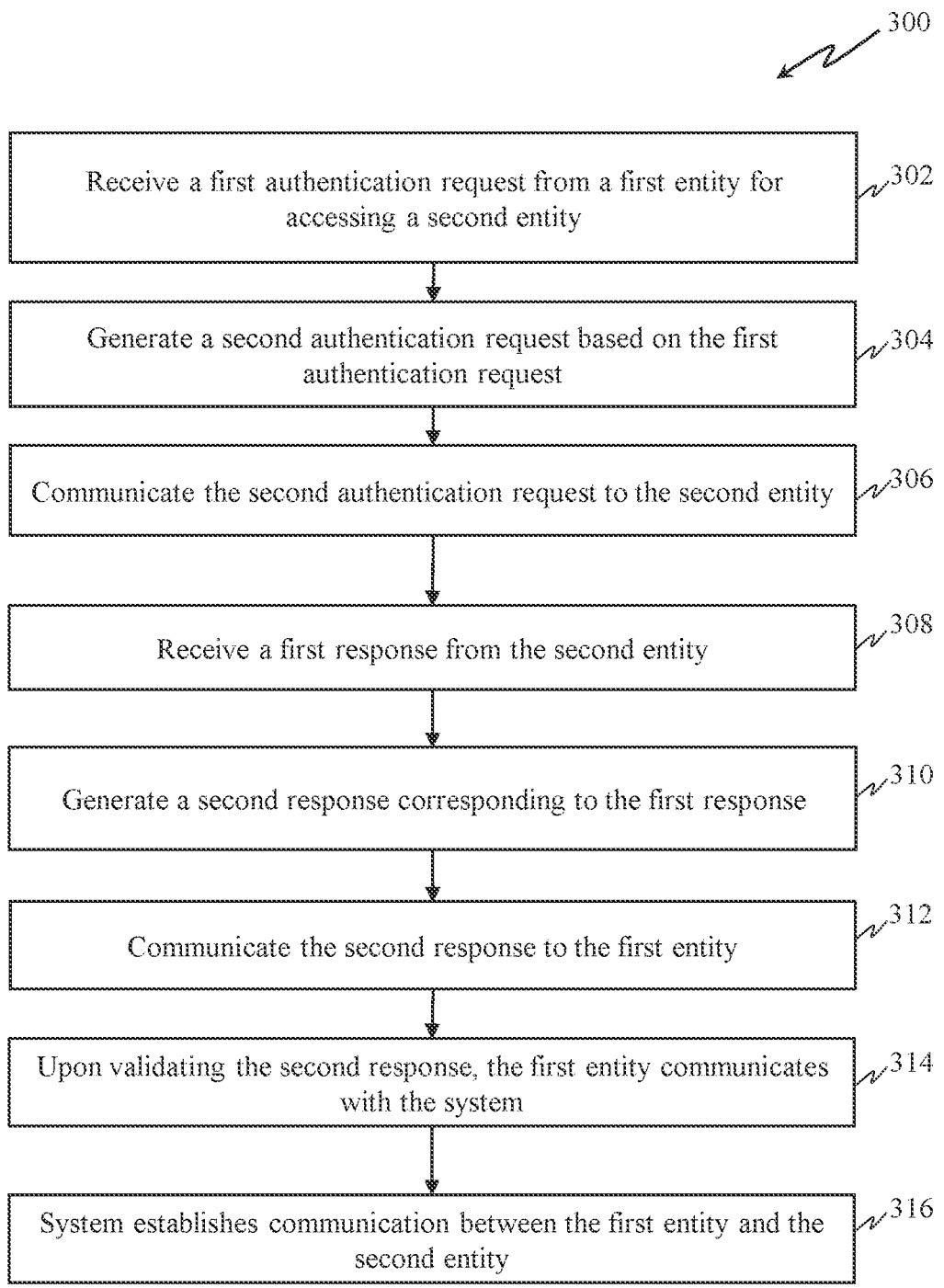
FIG. 3 is a flowchart 300 depicting a method of an embodiment for the system 100 enabling the single sign-on (SSO) authentication process, in accordance with an embodiment.

FIG. 3 illustrates a flow chart 300 depicting a method of an embodiment for enabling communication between multiple entities by implementing a digital Single Sign-On authentication process. The system 100 may be configured to bridge the gap between the first entity 102 and the second entity 104 by exchanging tokens that may correspond to respective authentication processes.

At step 302, the system 100 may be configured to receive a first authentication request from the first entity 102 initiated by a first user. The first authentication request may be provided by the first entity 102 to allow the first user gain access to the second entity 104. The first user may be registered with the first entity 102.

In an embodiment, the first authentication request may consist of a first token comprising a first information. The first information may comprise of a user identity of the first entity 102, information of at least one entity configured for validating the first authentication request, and/or at least a set of permissions for accessing resources of the second entity 104.

At step 304, the system 100 may be configured to generate a second authentication request based on the first authentication request that is received from the first entity 102. The second authentication request may correspond to the second authentication process, wherein the second entity 104 may employ a second authentication process.

In an embodiment, the second authentication request may comprise of a second token comprising of a second information, wherein the second information may correspond to the first information.

At step 306, the system 100 may be configured to communicate the second authentication request to the second entity 104.

At step 308, the system 100 may be configured to receive a first response from the second entity, wherein the first response corresponds to the second authentication request.

At step 310, the system 100 may be configured to generate a second response corresponding to the first response received from the second entity. In other words, the system 100 is configured to generate the second response, upon validation of the first response, based on the first token, wherein the second response corresponds to the first response.

At step 312, the system 100 may be configured to communicate the second response to the first entity 102.

At step 314, upon receiving and validating the second response, the first entity 102 may be configured to communicate confirmation to the system 100.

At step 316, the system 100 may establish communication between the first entity 102 and the second entity. Upon validation of the second response at the first entity 102, the first entity 102 may be configured to access to resources of the second entity for the first user.

In an embodiment, the first user may be registered with the system 100. Upon successful registration of the first user with the system 100, access to both the first entity 102 and the second entity 104 may be granted. The system 100 may be specifically configured to interact with the first entity 102 and the second entity 104, which employ distinct authentication processes. The system 100 may be capable of acting as an intermediary, translating user credentials and information into formats that can be understood and processed by different authentication services.

In an embodiment, the system 100 may be configured to provide a restricted access to the resources of the second entity 104 based on the set of permissions included in the first token. Further, in an embodiment, the system 100 may allow restricted access for users trying to sign in to the second entity, upon which, the system 100 may allow the user to use their credentials registered with one entity to sign in into another entity, securely. The restriction(s) may be defined by either the first entity 102 and/or the second entity 104 and may be communicated through the authentication token(s) exchanged between the two entities. The system 100 may ensure data compatibility between entities with different authentication methods, enhancing user experience and data protection.

In one embodiment, a method for user registration with a first entity 102 is disclosed. The method may comprise of the following steps:

a) The user initiates the registration process by sending a request to access the first entity 102. The request services may be in the form of, but not limited to, a login, accessing specific services, or performing any action that requires user authentication with the first entity 102.
b) Upon receiving the user's request, the first entity 102 proceeds to verify whether the user is registered with the first entity.
c) The first entity 102 validates the user's credentials to determine if the user is authentic or not. This validation process involves using the first authentication token(s) for verifying the user's identity.
d) If the authentication process is successful and the user's identity is successfully verified and authenticated, the user gains access to the first entity's services 102.
e) However, if the authentication process fails due to invalid or missing authentication token(s), the user's access may be denied and terminated.

The present invention is not limited to the specific embodiments described herein, as various modifications and alternative embodiments will be apparent to those skilled in the art.

Figure 4:
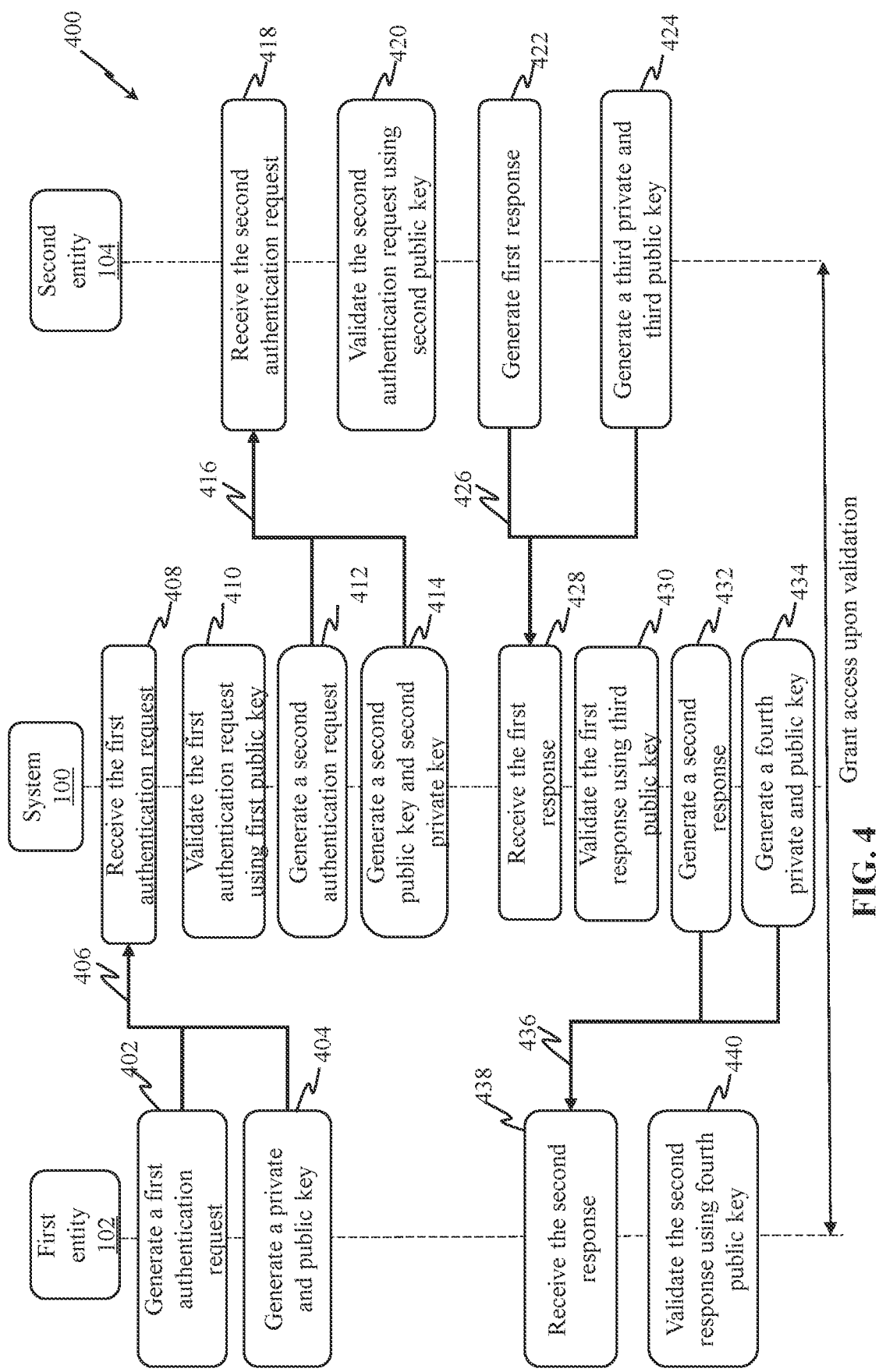
FIG. 4 is a sequence diagram 400 depicting a method of an embodiment for the system 100 enabling the single sign-on (SSO) authentication process, in accordance with an embodiment.

FIG. 4 illustrates a sequence diagram 400 depicting a method enabling a single sign-on (SSO) between the first entity 102 and the second entity 104, in accordance with an embodiment. In the current embodiment, the first entity 102 may employ a first authentication process, whereas the second entity 104 may employ the second authentication process. A user associated with the first entity 102 may attempt to access second entity 104. Since the two entities 102, 104 employ different authentication processes, the first entity 102 may request the system 100 to access second entity 104 on its behalf.

At step 402, the first entity 102 may generate a first authentication request, wherein the first authentication request may comprise of the at least a part of metadata associated with the user.

At step 404, the first entity 102 may generate a pair of cryptographic keys, i.e., a first public key and a first private key.

At step 406, the first authentication request along with the first public key may be sent to the system 100.

In an embodiment, during a handshake session between the first entity 102 and the system 100, the first entity 102 may share the first public key with the system 100, while keeping the first private key confidential. The handshake between different entities may typically involve a series of communication steps to establish trust, and exchange necessary information securely. The handshake may comprise of, but not limited to, initiating authentication process, exchanging of authentication credentials, establishing secure communication etc.

In an embodiment, the system 100 may be configured to verify the first authentication request by decrypting the first authentication request comprising the first token using the first public key, wherein the first authentication request may be encrypted by the first entity before sending it to the system 100.

At step 408, the system 100 may receive the first authentication protocol from the first entity 102 for accessing the second entity 104.

At step 410, the system 100 may validate the first authentication request provided by the first entity 102 using the first public key.

At step 412, upon validation of the first authentication request, the system 100 may generate a second authentication request. At step 414, the system 100 may be configured to generate a second public key and a second private key.

Further, the system 100 may be configured to encrypt the second authentication request using a second private key, wherein the second private key is associated with the second authentication request.

At step 416, the second authentication request along with the second public key may be sent to the second entity 104. At step 418, upon receiving the second authentication request, the second entity 104 may validate the second authentication request using the second public key.

At step 420, the second entity 104 may validate the second authentication request provided by the system 100 using the second public key.

At step 422, the second entity 104 may generate a first response based on the verification of user's credentials. At step 424, A third public key and a third private key may be generated by the second entity 104. The third public key is associated with the third private key, while the third private key is associated with the first response.

At step 426, the first response along with the third public key may be sent to the system 100.

At step 428, the system 100 may receive the first response from the second entity 104.

At step 430, the system 100 may be configured to validate the first response by decrypting the first response using a third public key.

At step 432, the system 100 may generate a second response based on the first response, wherein the second response corresponds to the first response.

At step 434, a fourth public key and a fourth private key may be generated by the system 100. The fourth public key is associated with the fourth private key, while the fourth private key is associated with the second response.

At step 436, the second response along with the fourth public key may sent to the first entity 102 by the system 100. At step 438, the first entity 102 may be configured to receive the second response.

At step 440, the first entity 102 validates the second response, wherein the second response is decrypted by the first entity 102 using the fourth public key. Upon validating the second response, the first entity 102 may be configured to communicate the completion of the authentication process to the system 100. The system 100 may further be configured to establish communication between the first entity 102 and the second entity 104.

In an embodiment, the system 100 may be configured to provide a restricted access to the resources of the second entity 104 based on a set of permissions included in the first authentication request.

In an embodiment, the system 100 may incorporate a multi-factor authentication (MFA) capability to enhance the user's account security. The system 100 may be configured with the multi-factor authentication to enable a second authentication, wherein upon validation of the second response at the first entity 102, the system 100 is configured to validate the second authentication to enable communication between the first entity 102 and the second entity 104. The multi-factor authentication (MFA) capability may comprise, but not limited to, a biometric verification and/or one-time passwords (OTP) and/or a SMS verification and/or an email verification and/or hardware token(s).

In an embodiment, the system 100 may be configured to either receive and/or share the respective public/private keys from the multiple entities for decrypting information received from the multiple entities.

In an alternate embodiment, first entity 102, system 100 and second entity 104 may be configured to share respective public/private keys with each other during a handshake session, wherein the shared respective public/private key may be used by respective entities for encryption/decryption.

Figure 5:
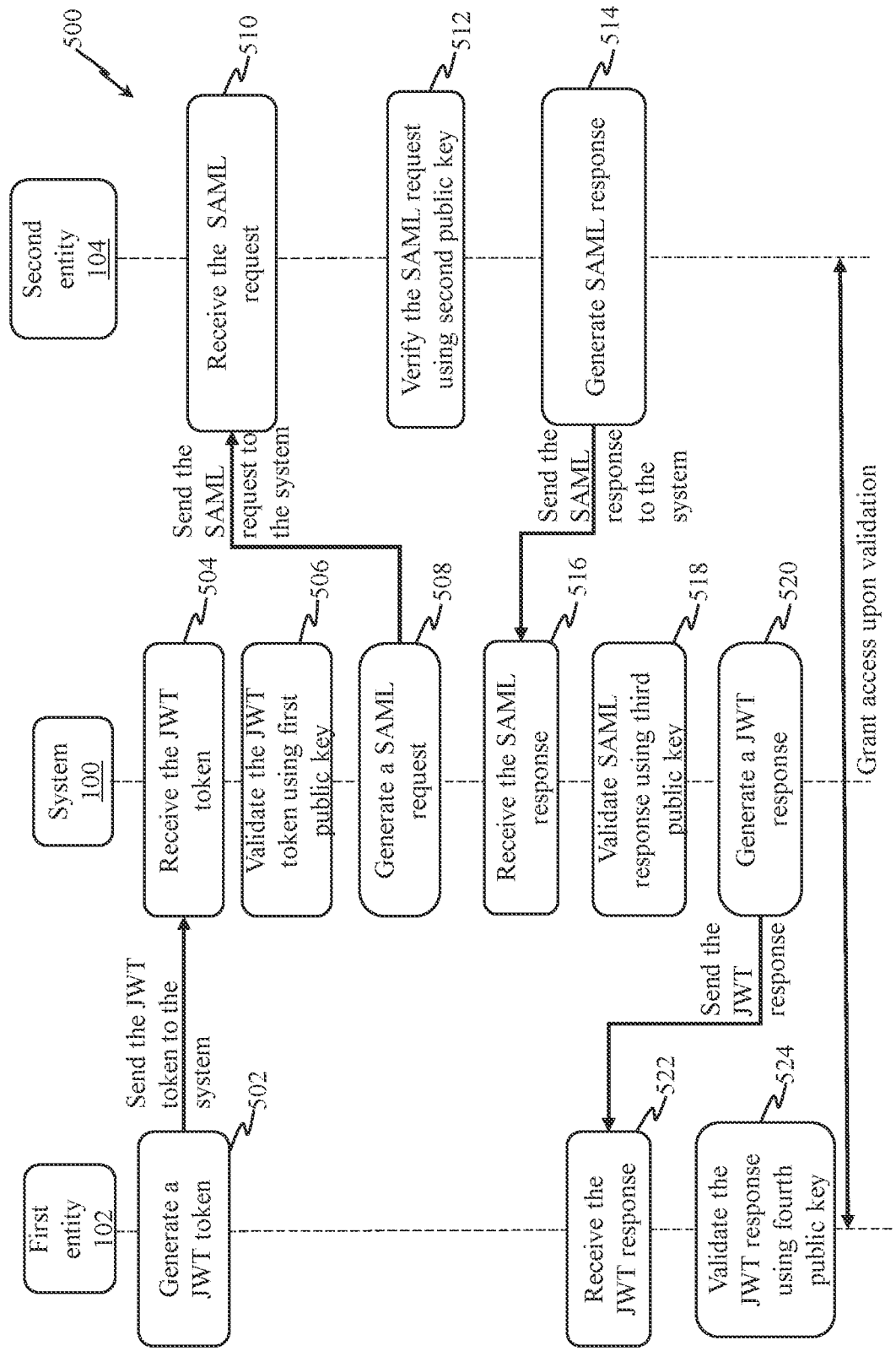
FIG. 5 is a sequence diagram 500 depicting a detailed method of an embodiment for the system 100 enabling a single sign-on (SSO) between the first entity 102 employing JWT authentication process and the second entity 104 employing SAML authentication process, in accordance with an embodiment.

FIG. 5 illustrates a sequence diagram 500 depicting a method enabling the single sign-on (SSO) using JWT and SAML authentication process, in accordance with an embodiment. In an embodiment, the first entity 102 may employ JWT authentication process, whereas the second entity 104 may employ SAML authentication process. The user associated with the first entity 102 attempts to access second entity 104. Since the two entities 102, 104 employ different authentication processes, the first entity 102 makes a request to the system 100 to access second entity 104 on its behalf.

At step 502, the first entity 102 may generate a JSON Web Token (JWT), wherein the JWT token may comprise of a first information to verify the user's credentials and authenticate the user in the second entity 104. Further, the first entity 102 may generate a pair of cryptographic keys, i.e., a first public key and a first private key. During a handshake between the first entity 102 and the system 100, the first entity 102 discloses the first public key with the system 100, while keeping the first private key confidential. The first public key is associated with the first private key, while the first private key is associated with the JWT token.

At step 504, upon receiving the JWT token, the system 100 may receive a request from the first entity 102 for accessing the second entity 104.

At step 506, the system 100 may validate the JWT token provided by the first entity 102 using the previously shared first public key, which was exchanged during the handshake process.

At step 508, the system 100 may generate a SAML request, upon validation of the JWT token. A second public key and a second private key may be generated by the system 100, wherein the second public key is communicated to the second entity 104 by the system 100 while retaining the second private key. The second public key is associated with the second private key, while the second private key is associated with the SAML request.

At step 510, the system 100 may receive a SAML request along with the second public key.

At step 512, the second entity 104 may verify the SAML request by decrypting the SAML request with the previously shared second public key.

At step 514, the second entity 104 may generate a SAML response based on the verification of user's credentials. A third public key and a third private key may be generated by the second entity, wherein the third public key is communicated to the system 100 by the second entity 104 while retaining the third private key. The third public key is associated with the third private key, while the third private key is associated with the SAML response.

At step 516, the system 100 may receive the SAML response from the second entity 104 along with the third public key.

At step 518, the system 100 may validate the SAML response by decrypting the SAML response using the third public key, wherein the SAML response is encrypted by the second entity 104 using the third private key.

At step 520, the system 100 may generate a JWT response based on the SAML response. A fourth public key and a fourth private key may be generated by the system 100, wherein the fourth public key is communicated to the first entity 102 by the system 100 while retaining the fourth private key. The fourth public key is associated with the fourth private key, while the fourth private key is associated with the JWT response.

At step 522, upon receiving the JWT response, the first entity 102 may validate the received JWT response.

At step 524, the first entity 102 may validate the JWT response, wherein the JWT response is decrypted by the first entity 102 using the fourth public key. Upon validating the JWT response, the first entity 102 may communicate with the system 100 to establish a connection between the first entity 102 and the second entity 104.

In an embodiment, the system 100 may provide a restricted access to the resources of the second entity 104 based on the set of permissions included in the JWT token.

In an embodiment, the first entity 102 may generate the JWT token based on the user's credentials. The user's credentials may include, but not limited to name, email ID, addresses etc.

In an embodiment, the system 100 may be configured to record and log user activities and access history for monitoring purposes. Further, the system 100 may be configured to receive a first instruction to enable a user to log out from multiple entities wherein the user may be logged in. The first instruction may be, but not limited to, a command "LOGOUT_ALL" to log out from all active sessions and entities. Once the user is authenticated, the user can issue the specific command "LOGOUT_ALL" to initiate the logout process from all the entities where the user is currently logged into. This approach ensures that the user's identity is confirmed before allowing them to perform such a sensitive operation like logging out from multiple entities simultaneously.

In an embodiment, the system 100 may be further configured to provide a comprehensive insight into user activities within the entities, wherein the comprehensive insights may be configured to analysing login history, usage patterns, and security-related events. By analysing such data, potential issues can be identified, user engagement can be tracked, and overall user experience can be improved.

In an embodiment, the system 100 may enable access between multiple entities, each with different authentication processes. The system 100 may ensure that the multiple entities do not need to share metadata with one another during the authentication process, making metadata sharing unnecessary for authentication. As each entity employ different authentication process independently, exchange sensitive information (metadata) is not required.

In an embodiment, the system 100 may also be configured to offer visual aspects of the Single Sign-On (SSO) portal to their specifications. The system 100 may be configured to provide options to the user, wherein users may effortlessly incorporate their logos, choose color schemes that align with their brand, and integrate branding elements that represent their entity's aesthetics. By enabling customization, the system ensures a cohesive and unified user experience across various entities accessed through the SSO portal. The system's consistency not only enhances the overall user experience but also reinforces the brand identity of the organization or entity using the SSO solution. Users may provide a branded and professional interface to their entities, reinforcing their commitment to security and establishing a sense of trust and familiarity among users as they interact with the SSO portal.

Figure 6:
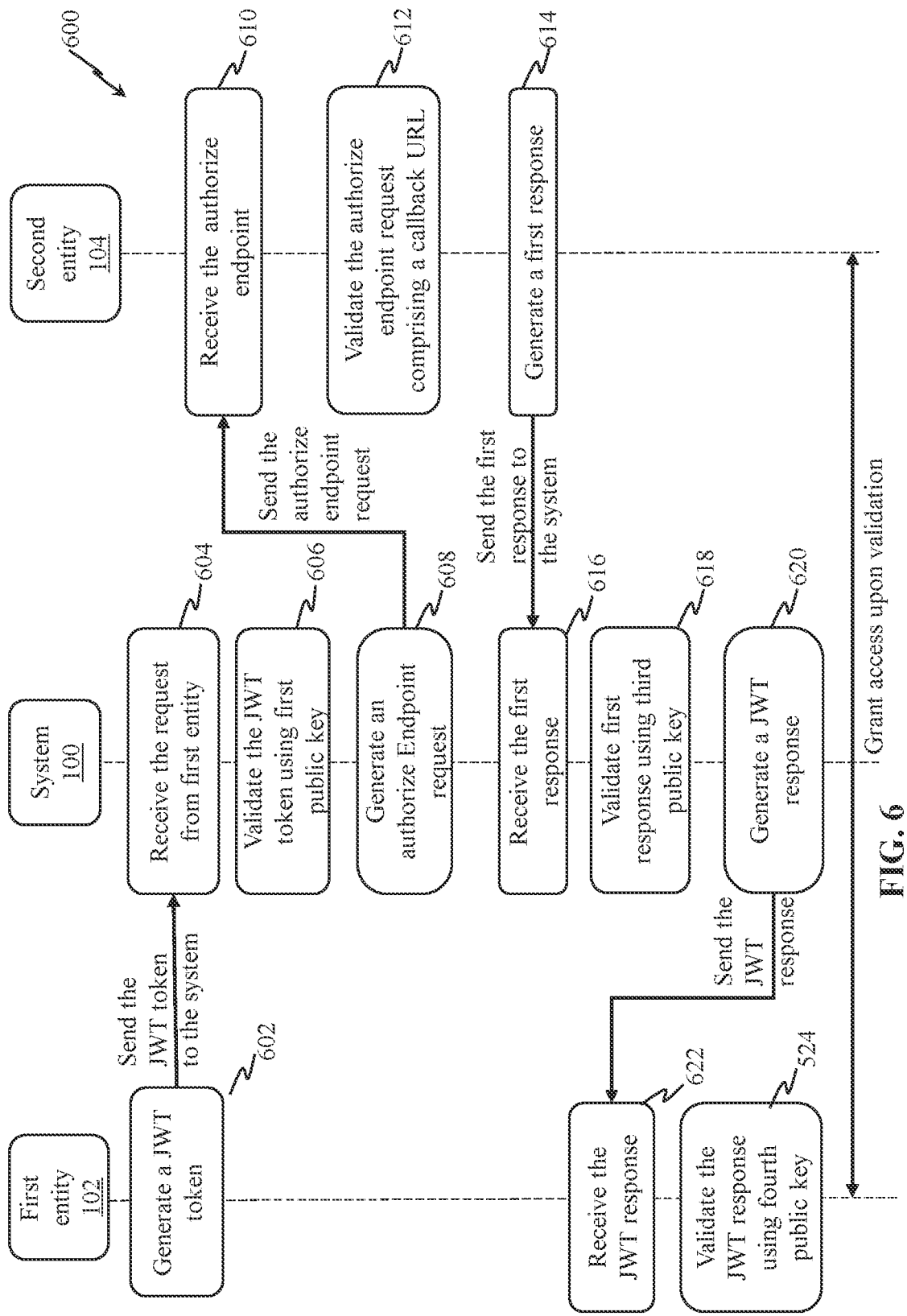
FIG. 6 is a sequence diagram 600 depicting a detailed method of an embodiment for the system 100 enabling a single sign-on (SSO) between the first entity 102 employing JWT authentication process and the second entity 104 employing OAuth authentication process, in accordance with an embodiment.

FIG. 6 illustrates a sequence diagram 600 depicting a method of an embodiment for the system 100 enabling the single sign-on (SSO) using JWT and OAuth authentication process, in accordance with an embodiment. In the current embodiment, the first entity 102 may employ JWT authentication process, whereas the second entity 104 may employ OAuth authentication process. The user associated with the first entity 102 may attempt to access second entity 104. Since the two entities 102, 104 employ different authentication process, the first entity 102 may request the system 100 to access second entity 104 on its behalf.

At step 602, the first entity 102 may generate a JSON Web Token (JWT token) to verify the user's credentials and authenticate the user to the system 100. Further, the first entity 102 may also generate a pair of cryptographic keys, i.e., a first public key and a first private key.

In an embodiment, during a handshake between the first entity 102 and the system 100, the first entity 102 may disclose the first public key with the system 100, while keeping the first private key confidential. The first public key may be associated with the first private key, while the first private key may be associated with the JWT token.

At step 604, upon receiving the JWT token, the system 100 may receive a JWT request from the first entity 102 for accessing the second entity 104.

At step 606, the system 100 may validate the JWT token provided by the first entity 102 using the first public key.

At step 608, the system 100 may generate an authorize endpoint request, upon validation of the JWT token. Further, a second public key and a second private key may be generated by the system 100, wherein the second public key may be communicated to the second entity 104 by the system 100 while retaining the second private key. The second public key may be associated with the second private key, while the second private key may be associated with the authorize endpoint request.

In an embodiment, the authorize endpoint comprise of a callback URL. The callback URL may also be referred to, but not limited to, a redirect URL or callback endpoint. The callback URL may be a specific web address or URI (Uniform Resource Identifier) provided by the system 100 to access multiple entities. The callback URL may be used as a means of communication between the system 100 and the second entity 104 during various authentication process. When the system 100 communicates with the second entity 104, the system 100 may provide the callback URL as part of its request to the second entity 104.

At step 610, the second entity 104 may receive the authorize endpoint request from the system 100 to validate the user's credentials.

At step 612, the second entity 104 may validate the authorize endpoint request. The validation is employed by decrypting the previously shared second public key.

At step 614, the second entity 104 may generate a first response based on the verification of user's credentials. A third public key and a third private key may be generated by the second entity 104, wherein the third public key is communicated to the system 100 by the second entity 104 while retaining the third private key. The third public key is associated with the third private key, while the third private key is associated with the first response.

At step 616, the system 100 may receive the first response from the second entity 104.

At step 618, the system 100 may validate the first response by decrypting the first response using the third public key, wherein the first response is encrypted by the second entity 104 using the third private key.

At step 620, the system 100 may generate a JWT response based on the first response. A fourth public key and a fourth private key may be generated by the system 100, wherein the fourth public key is communicated to the first entity 102 by the system 100 while retaining the fourth private key. The fourth public key is associated with the fourth private key, while the fourth private key is associated with the JWT response.

At step 622, upon receiving the JWT response, the first entity 102 validates the received JWT response.

At step 624, the first entity 102 may validate the JWT response, wherein the JWT response is decrypted by the first entity 102 using the fourth public key. Upon validating the JWT response, the system 100 enables communication between the first entity 102 and the second entity. Further, the system 100 also provides a restricted access to the resources of the second entity 104 based on the set of permissions included in the JWT token.

Figure 7:
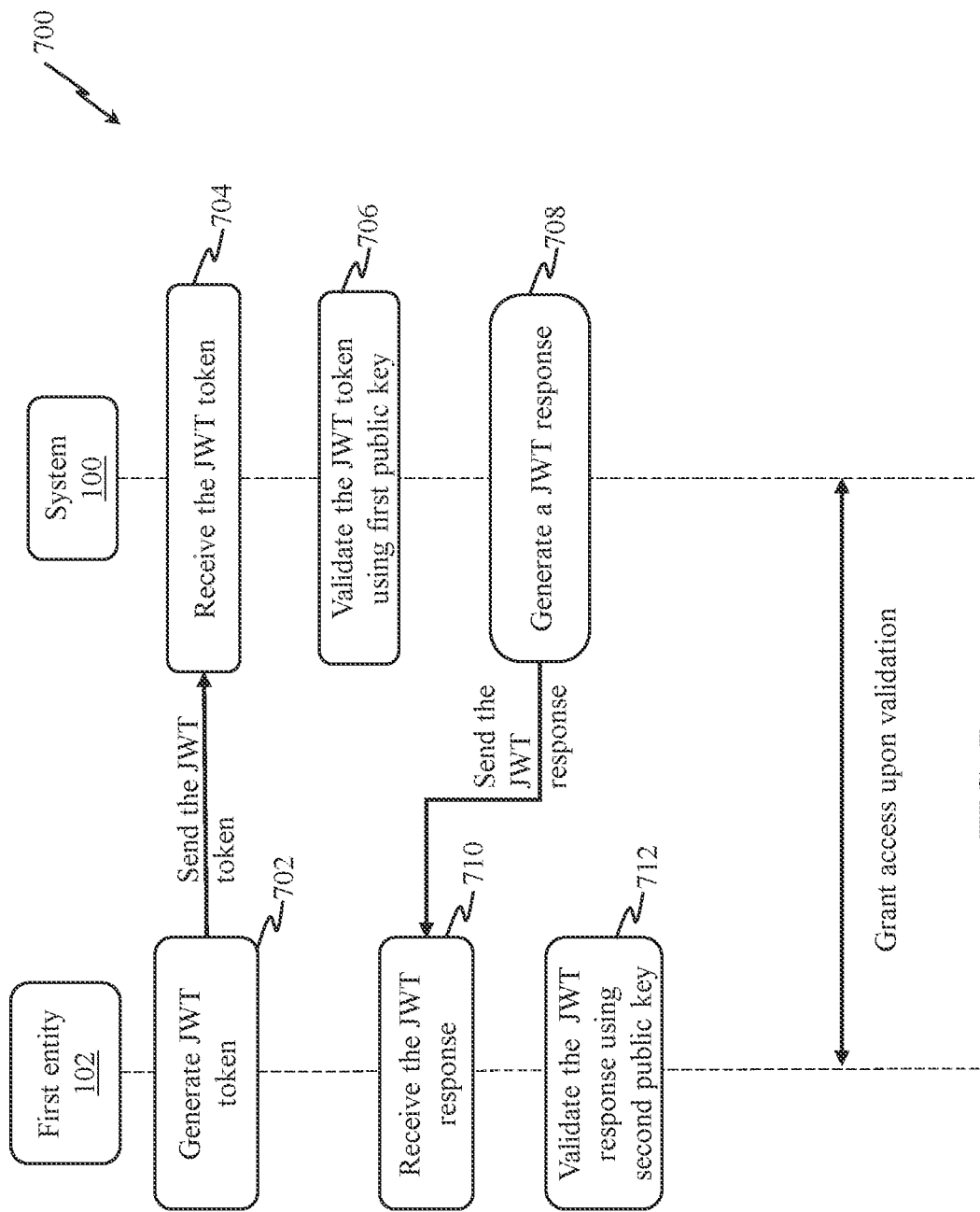
FIG. 7 is a sequence diagram 700 depicting a method of an embodiment for the system 100 enabling the single sign-on (SSO) between the first entity 102 employing JWT authentication process and the system 100, in accordance with an embodiment.

In an embodiment, the system 100 may be similar to the second entity 104, wherein the system 100 may be configured to provide similar services as that of the second entity 104. FIG. 7 illustrates a method wherein the first entity 102 accesses services of the system 100. Assuming that the system 100 employs SAML authentication process.

At step 702, the first entity 102 may generate a JSON Web Token (JWT token) to verify a user's credentials and authenticate the user to the system 100. Further, the first entity 102 may generate a pair of cryptographic keys, i.e., a first public key and a first private key.

In an embodiment, during a handshake between the first entity 102 and the system 100, the first entity 102 may disclose the first public key with the system 100, while keeping the first private key confidential. The first public key may be associated with the first private key, while the first private key may be associated with the JWT token.

At step 704, upon receiving the JWT token, the system 100 may receive a request from the first entity 102 to access the system 100, wherein the system 100 employs SAML authentication process.

At step 706, the system 100 may validate the JWT token provided by the first entity 102 using the first public key.

At step 708, the system 100 may generate a JWT response and communicate the JWT response to the first entity, wherein the system 100 may be configured to employ SAML authentication process. A second public key and a second private key may be generated by the system 100, wherein the second public key may be communicated to the second entity 104 by the system 100 while retaining the second private key. The second public key may be associated with the second private key, while the second private key may be associated with the JWT response.

At step 710, the first entity 102 may receive the JWT response from the system 100.

At step 712, the system 100 may validate the JWT response by decrypting the JWT response using the second public key. Upon validating the JWT response, the system 100 may establish communication between the first entity 102 and the system 100. Further, the system 100 may be configured to provide a restricted access to the resources based on the set of permissions included in the JWT token.

In an embodiment, the system 100 may be configured to offer a unified interface for regulating access control and permissions within the entities. The system 100 may provide a role-based access control, fine-grained permission control, and integration with external authorization services such as OAuth or OpenID Connect, enhancing security measures. The system 100 employing role-based access control comprises organizing the users to process a managing access control by grouping plurality of users with similar access needs and enabling the system 100 to easily enforce consistency and scalability access policies. The system 100 employing fine-grained permissions may have predefined access levels. The fine-grained permissions enhance security by ensuring that users only have access to the limited resources that is necessary thereby minimizing potential risks from overprivileged accounts. The system 100 employing integration with external authorization services such as OAuth or OpenID Connect are widely used protocols for secure authentication and authorization in various entities. The system 100 may enhance the security capabilities and ensures a more reliable and standardized approach to access control. By combining role-based access control, fine-grained permissions, and integration with external authorization services, the system 100 may create a comprehensive access control framework. This framework may allow administrators to define and manage access policies more efficiently, reducing the likelihood of security breaches and unauthorized access.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and process or method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A single sign-on (SSO) authentication system for enabling digital communication between multiple entities, the system comprising:
   one or more processors; and
   a non-transitory memory communicatively coupled to the one or more processors, wherein the one or more processors are configured to execute instructions stored in the non-transitory memory, the instructions causing the one or more processors to:
   receive, from a first entity, a first authentication request for accessing a second entity, wherein the first authentication request comprises of a first token comprising a first information;
   generate a second authentication request based on the first authentication request received from the first entity, wherein the second authentication request comprises of a second token comprising a second information;
   communicate the second authentication request to the second entity;
   receive, from the second entity, a first response corresponding to the second authentication request;
   generate a second response corresponding to the first response received from the second entity;

communicate the second response to the first entity; and enable communication between the first entity and the second entity upon validation of the second response by the first entity, wherein, the first entity employs a first authentication process;

the second entity employs a second authentication process;

the first authentication request corresponds to the first authentication process; and the second authentication request corresponds to the second authentication process.

2. The system according to claim 1, wherein the one or more processors are configured to:

validate the first authentication request by decrypting the first authentication request using a first public key, wherein:

the first public key is associated with a first private key;

the first private key is associated with the first authentication request; and the first authentication request is encrypted by the first entity using the first private key;

generate the second authentication request, upon validation of the first authentication request, based on the first token, wherein the second authentication request corresponds to the first authentication request;

encrypt the second authentication request using a second private key, wherein the second private key is associated with a second public key; and communicate the encrypted second authentication request to the second entity, wherein the second authentication request is decrypted by the second entity using the second public key.

3. The system according to claim 2, wherein the one or more processors are configured to:

validate the first response by decrypting the first response using a third public key, wherein:

the third public key is associated with a third private key;

the third private key is associated with the first response; and the first response is encrypted by the second entity using the third private key;

generate the second response, upon validation of the first response, based on the first token, wherein the second response corresponds to the first response;

encrypt the second response using a fourth private key, wherein the fourth private key is associated with a fourth public key; and communicate the encrypted second response to the first entity, wherein the second response is decrypted by the first entity using the fourth public key.

4. The system according to claim 3, wherein the one or more processors are configured to enable communication between the first entity and the second entity upon validation of the second response by the first entity, wherein the second response is decrypted using the fourth public key.

5. The system according to claim 4, wherein:

the first public key and the first private key are generated by the first entity, wherein the first public key is communicated to the system by the first entity while retaining the first private key;

the second public key and the second private key are generated by the system, wherein the second public key is communicated to the second entity by the system while retaining the second private key;

the third public key and the third private key are generated by the second entity, wherein the third public key is communicated to the system by the second entity while retaining the third private key; and the fourth public key and the fourth private key are generated by the system, wherein the fourth public key is communicated to the first entity by the system while retaining the fourth private key.

6. The system according to claim 5, wherein the system comprises:

a database, wherein the database is configured to store information related to the multiple entities and plurality of users, wherein the users are registered with at least one entity among the multiple entities; and a communication module, wherein the communication module is configured to enable communication between the system and the multiple entities.

7. The system according to claim 6, wherein the processor, when receives a first instruction, is configured to enable a user to log out from multiple entities.

8. The system according to claim 5, wherein, the system is configured to receive the respective public/private keys from the multiple entities for decrypting information received from the multiple entities; and the system is configured to share the respective public/private keys with the multiple entities for decrypting information shared by the system with the multiple entities.

9. The system according to claim 1, wherein the system is configured with a Multi-factor authentication to enable a second authentication, wherein upon validation of the second response at the first entity, the system is configured to validate the second authentication to enable communication between the first entity and the second entity.

10. The system according to claim 1, wherein upon validation of the second response at the first entity the first entity is configured to access resources of the second entity.

11. The system according to claim 10, wherein, the first information comprises:

a user identity of the first entity;

information of at least one entity configured for validating the first authentication request; and at least a set of permissions for accessing resources of the second entity; and the second information corresponds to the first information.

12. The system according to claim 11, wherein the system is configured to provide a restricted access to the resources of the second entity based on the set of permissions included in the first token.

13. A method for enabling digital communication between multiple entities by a single sign-on (SSO) authentication system, wherein the method comprising:

receiving, from a first entity, a first authentication request for accessing a second entity;

generating a second authentication request based on the first authentication request received from the first entity;

communicating the second authentication request to the second entity;

receiving, from the second entity, a first response corresponding to the second authentication request;

generating a second response corresponding to the first response received from the second entity;

communicating the second response to the first entity; and enabling communication between the first entity and the second entity upon validation of the second response by the first entity, wherein, the first entity employs a first authentication process;

the second entity employs a second authentication process;

the first authentication request corresponds to the first authentication process; and the second authentication request corresponds to the second authentication process.

14. The method according to claim 13 comprising:

validating the first authentication request by decrypting the first authentication request using a first public key, wherein:

the first public key is associated with a first private key;

the first private key is associated with the first entity; and the first authentication request is encrypted by the first entity using the first private key;

generating the second authentication request, upon validation of the first authentication request, based on the first token, wherein the second authentication request corresponds to the first authentication request;

encrypting the second authentication request using a second private key, wherein the second private key is associated with a second public key; and communicating the encrypted second authentication request to the second entity, wherein the second authentication request is decrypted by the second entity using the second public key.

15. The method according to claim 14 comprising:

validating the first response by decrypting the first response using a third public key, wherein:

the third public key is associated with a third private key;

the third private key is associated with the second entity; and the first response is encrypted by the second entity using the third private key;

generating the second response, upon validation of the first response, based on the first token, wherein the second response corresponds to the first response;

encrypting the second response using a fourth private key, wherein the fourth private key is associated with a fourth public key; and communicating the encrypted second response to the first entity, wherein the second response is decrypted by the first entity using the fourth public key.

* * * * *